(12) United States Patent  
Karlsson

(10) Patent No.: US 9,161,287 B2  
(45) Date of Patent: Oct. 13, 2015

(54) TECHNIQUE FOR EFFICIENT MESSAGE DELIVERY IN AD HOC, MESH, WIRELESS COMPUTER NETWORKS

(71) Applicant: Lars Karlsson, Santa Clara, CA (US)

(72) Inventor: Lars Karlsson, Santa Clara, CA (US)

(73) Assignee: SPECTRANETIX, INC., Santa Clara, CA (US)

( * ) Notice: Subject to any disclaimer, the term of this patent is extended or adjusted under 35 U.S.C. 154(b) by 273 days.

(21) Appl. No.: 13/653,112

(22) Filed: Oct. 16, 2012

(65) Prior Publication Data

US 2014/0108595 A1   Apr. 17, 2014

(51) Int. Cl.
*G06F 15/16* (2006.01)
*H04W 40/00* (2009.01)
*H04L 12/701* (2013.01)

(52) U.S. Cl.
CPC ............... *H04W 40/00* (2013.01); *H04L 45/00* (2013.01)

(58) Field of Classification Search
CPC ....................................................... G06F 15/16
USPC ........................................................... 709/217
See application file for complete search history.

(56) References Cited

U.S. PATENT DOCUMENTS

| | | | |
|---|---|---|---|
| 6,640,241 B1 * | 10/2003 | Ozzie et al. | 709/204 |
| 2006/0075133 A1 * | 4/2006 | Kakivaya et al. | 709/237 |
| 2008/0002599 A1 * | 1/2008 | Yau et al. | 370/310 |
| 2009/0175223 A1 * | 7/2009 | Hall | 370/328 |
| 2009/0201928 A1 * | 8/2009 | Chen et al. | 370/390 |
| 2009/0265475 A1 * | 10/2009 | Fujita | 709/231 |
| 2009/0319824 A1 * | 12/2009 | Liu et al. | 714/4 |
| 2013/0060962 A1 * | 3/2013 | Wang et al. | 709/238 |

* cited by examiner

*Primary Examiner* — Brian J Gillis
*Assistant Examiner* — Amy Ling
(74) *Attorney, Agent, or Firm* — Steins & Associates, P.C.

(57) ABSTRACT

A Technique for Efficient Message Delivery in Ad Hoc, Mesh, Wireless Computer Networks. The method and system of the present invention permits reliable wireless messaging between nodes on an ad hoc basis. The method is executed at each node in an iterative fashion. If a node is not the destination node for a particular message, that node will retransmit a received message. As the message is received and retransmitted from node to node, the message will propagate through the networked nodes until it reaches its destination node. In order to prevent the retransmission of messages into perpetuity, the method will limit the number of times that a particular node can retransmit a particular message. Once that retransmission limit is reached by a particular node for a particular message, the message retransmission will cease at that node, and the message will expire. The message will also expire after a pre-set time to live parameter has elapsed.

9 Claims, 4 Drawing Sheets

TECHNIQUE FOR EFFICIENT MESSAGE DELIVERY IN AD HOC, MESH, WIRELESS COMPUTER NETWORKS

This application is filed within one year of, and claims priority to Provisional Application Ser. No. 61/548,112, filed Oct. 17, 2011.

BACKGROUND OF THE INVENTION

1. Field of the Invention

This invention relates generally to wireless communications methods and systems and, more specifically, to a Technique for Efficient Message Delivery in Ad Hoc, Mesh, Wireless Computer Networks.

2. Description of Related Art

Modern computer networks facilitate data transmission between multiple devices. Each device in the network receives every data transmission and then retransmits if the data is not intended for it. This ensures that the message will reach its intended recipient if possible. To prevent potential infinite message transmission loops, current computer networks employ a variety of tactics to make sure that data transactions ultimately expire (instead of being re-transmitted into perpetuity). One popular method is to use a "hop count" to determine the maximum number of nodes that the message can be relayed through. Under the conventional "hop count" approach, each transmission carries with it a TTL field that is decremented by each node it encounters. When the TTL field is zero, the message is no longer retransmitted (i.e. the message expires).

The "hop count" approach is adequate for linear or tree topologies, where the route has a natural endpoint, but it is very inefficient for mesh networks because for large hop counts the message will continue to be echoed throughout the network long after the message has been received by its intended recipient.

A second method commonly employed to prevent circular message loops is the "route table" approach., which can be accomplished in one of two ways. First, a central master device can keep a list of possible routes to each destination. In a second version, the network is pre-staged or initialized so that each node is expected to know its closest neighbor nodes.

Both "route table" methods are poor choices for ad hoc networks where devices can come and go or move around as they please. If a vital link in the network leaves the network (as is common in ad hoc, mesh topologies), then the route table is no longer valid and messages will not receive their intended recipient.

Current standard lower level networking protocols and techniques perform well in situations where the topology is tightly controlled or a central master server has complete control and knowledge of routing. However, these techniques fail or are wasteful when faced with network that both (1) have no set topology (mesh) and (2) allow devices to come and go as they please. Rings in the topology can create message loopbacks that propagate the message far after it's been received and missing critical path nodes can prevent messages from reaching their destination in systems where the route is known a priori. A modern transaction routing technique should be able to accommodate dynamic network devices and random topologies.

What is needed is a method to efficiently route messages in an ad hoc, mesh network that (1) ensures delivery of the message while (2) preventing recurring route loops. The method and system of the present invention puts forth such a method.

This invention seeks to provide a transaction routing technique that will enable modern wireless, ad hoc, mesh networks to meet these requirements. Broadcast messages ensure that every node in the network, regardless of the topology, receives the message while each node's message cache table permits the message to be transmitted only once through the system. Furthermore, because the message is not stored permanently at each node in the mesh network, the entire invention lends itself to low resource implementations.

SUMMARY OF THE INVENTION

In light of the aforementioned problems associated with the prior methods and systems, it is an object of the present invention to provide a Technique for Efficient Message Delivery in Ad Hoc, Mesh, Wireless Computer Networks. The method and system of the present invention should permit reliable wireless messaging between nodes on an ad hoc basis. The method should be executed at each node in an iterative fashion, If a node is not the destination node for a particular message, that node should retransmit a received message. As the message is received and retransmitted from node to node, the message should propagate through the networked nodes until it reaches its destination node. In order to prevent the retransmission of messages into perpetuity, the method should further limit the number of times that a particular node can retransmit a particular message. Once that retransmission limit is reached by a particular node for a particular message, the message retransmission should cease at that node, and the message should expire. The message should further expire after a pre-set time to live parameter has elapsed.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Technique for Efficient Message Delivery in Ad Hoc, Mesh, Wireless Computer Networks.

Figure 1:
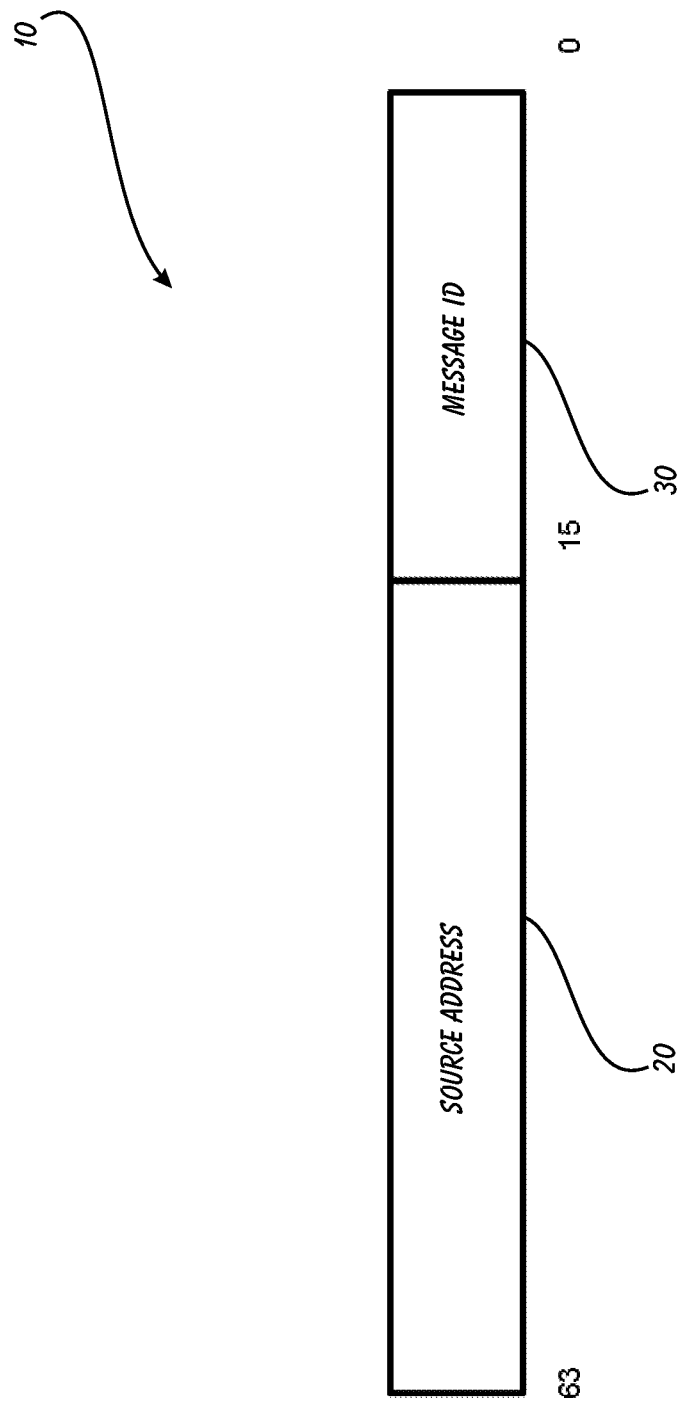
FIG. 1 is a diagram of the transaction header of each data message used in the method and system of the present invention.

The present invention can best be understood by initial consideration of FIG. 1.[1] FIG. 1 is a diagram of the transaction header of each data message used in the method and system of the present invention. In this case, the first field is a source address 20 that indicates node where the message originated (the source node—SN). The second field is a simple counter that increments every time the source node sends a new message 30. Together these fields form a unique message identifier that can be used the track the message throughout the network.

[1] As used throughout this disclosure, element numbers enclosed in square brackets [ ] indicates that the referenced element is not shown in the instant drawing figure, but rather is displayed elsewhere in another drawing figure.

Figure 2:
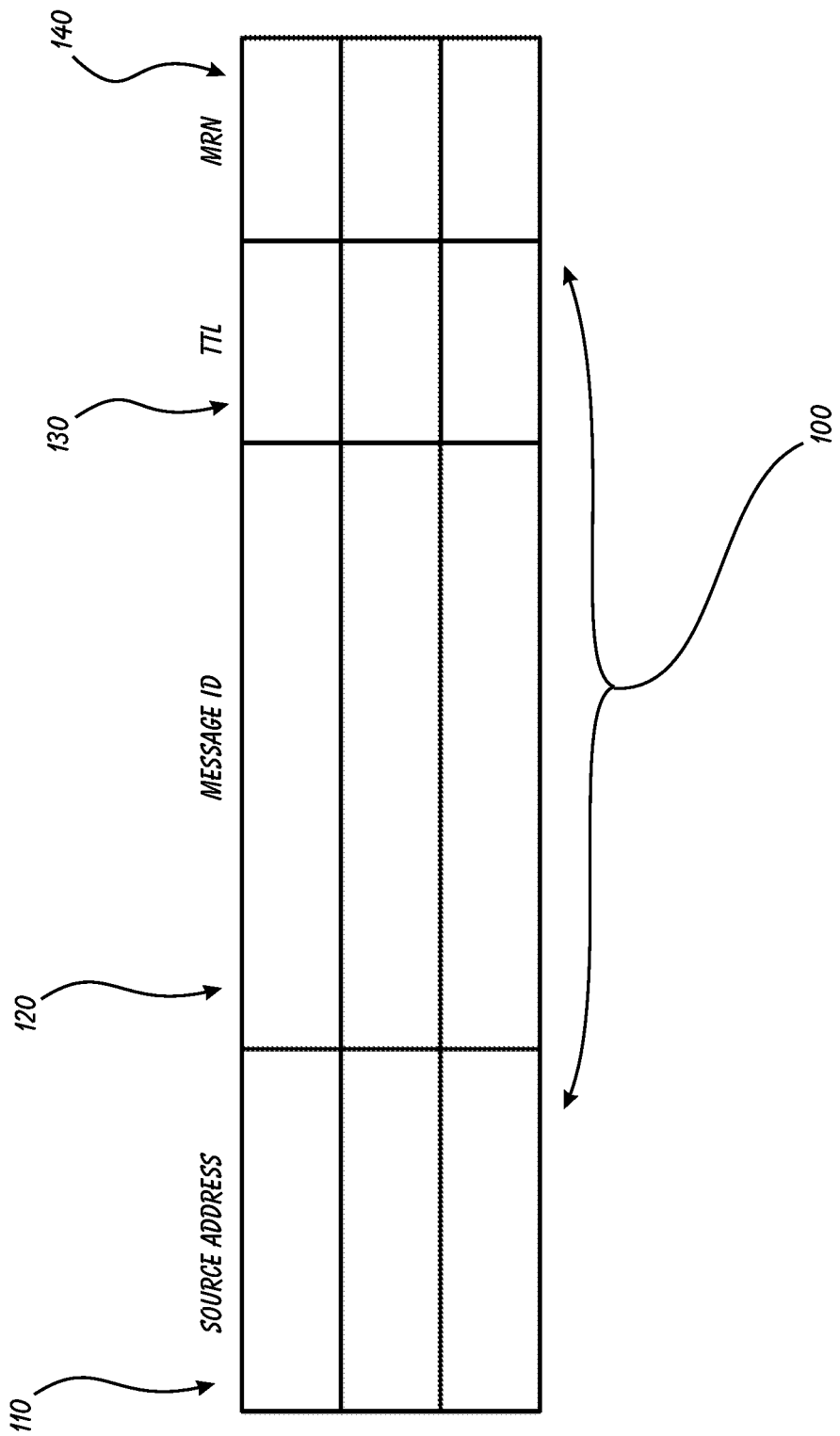
FIG. 2 is a diagram of the cache table stored in each node of the network of the method and system of the present invention.

FIG. 2 outlines a typical message cache table present in the memory space of each node in the network. The transaction header for each new message passing the node is stored in this cache 100 and is assigned a local Maximum Retransmission Number (MRN) 140 and a time to live (TTL) 130 for when the message header was last seen. The cache 100 also has columns for source address 110 and message ID 120.

The MRN value 140 is that number of retransmissions of a particular message that a node will execute. The message is then retransmitted and the MRN value 140 in the cache is reduced by one. If, upon receipt, the node determines that the message had already been "seen" (i.e. received), then that message will not be retransmitted afresh (i.e. it will only be retransmitted for that number of times as dictated by the MRN—receipt of a second copy of the message will not re-set the MRN). This is accomplished by examining the MRN for a particular message ID—if the MRN value 140 in the cache table is already at zero then no retransmission occurs.

The transmissions are delayed a random amount of time to reduce the likelihood of message collisions. The nodes receiver will listen before it transmits to further reduce the chance of a collision. The TTL number 130 is reduced at even clock intervals and when the TTL number 130 has reached zero the message header is removed from the cache. The nodes do not need to know its neighbors, and no master node is required in the network. This makes the invention well-suited for mesh, ad hoc wireless networks. The first two figures taken together comprise a diagram of the invention.

Figure 3:
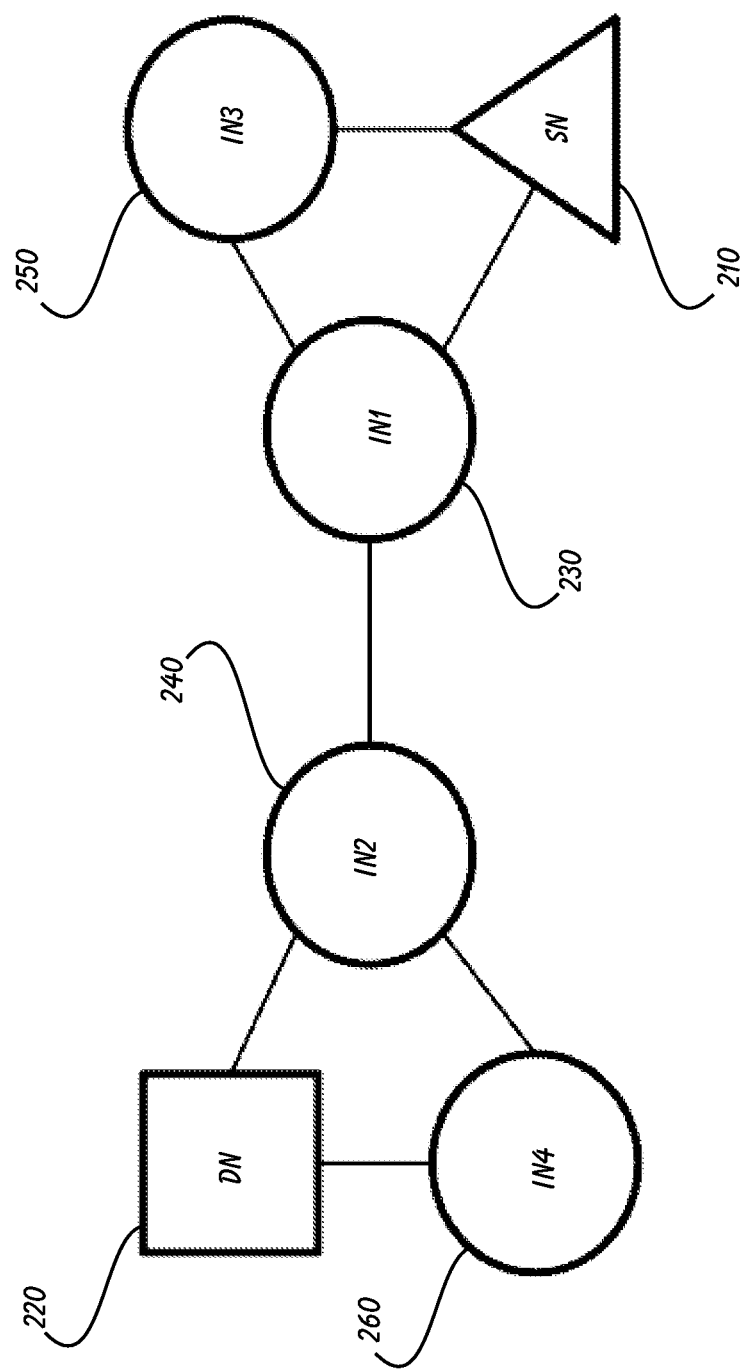
FIG. 3 an example diagram of a preferred embodiment of the mesh network topology.

FIG. 3 is an example wireless, mesh network topology 200 of the present invention. Every node may or may not be visible to all the other nodes within its range. The protocol also includes an acknowledgment message sent from the destination node back to the source node of the message to confirm assured delivery. In the case of a broadcast message addressed to every node in the network no acknowledgment is sent. The triangular node is a transmitting node (SN) with a message intended for the square, destination node (DN). An arbitrary number of other topologies are possible.

DIAGRAM REFERENCE NUMERALS

10 Transaction Header
20 Source Address
30 Message Identification
100 Node Message Cache
110 Source Address Column
120 Message Identification Column
130 Time-To-Live Column (TTL)
140 Maximum Retransmission Number (MRN)
200 Example Mesh Network
210 Source Node
220 Destination Node
230 Intermediate Node 1
240 Intermediate Node 2
250 Intermediate Node 3
260 Intermediate Node 4
300 Invention Operation The operation of the invention is described here in this section. In an ad hoc, mesh, wireless network, no strict topology is forced onto the devices and devices are free to come and go as necessary. The example mesh network 200 is a diagram of what a typical wireless mesh network could look like. When a device, also called a node, transmits a message it does so as a broadcast message to any and all visible devices within its range. Transmitting node 210 (DN) broadcasts its message to every node in its range; in this case, the only receiving nodes are intermediate node one 230 (IN1) and intermediate node three 250 (IN3).

Each node then records the transmission header 10 in the node's individual message cache 100. Each field (source address 20 and message ID 30) are stored in the appropriate field of the cache (source address column 110 and message ID column 120) a TTL 130 time value and an MRN number is assigned to each entry.

Intermediate node one 230 (IN1) will repeat the message, broadcasting it again to each of its neighbors. As a result intermediate node three 250 (IN3) will see the message again, but will retransmit the message only if the MRN value associated with the unique transaction header 10 in the cache 100 is larger than zero. The TTL 130 time value will count down at even time intervals until it reaches zero at which time the message header [10] will be removed from the node's cache 100.

This pattern will continue until destination node 220 receives the packet from intermediate node two 240 (IN2). The transaction header 10 for this message will reside in each node's message cache 100 until the TTL 130 counter expires. Nominally this TTL value would only have to be at the most a second or two for most networks. The MRN value is typically 2 or 3 depending of how many forced retransmissions that are desired. If in case of a collision a message have not been received by a neighboring node the message will be repeated again without having to go back to the message source node.

The ultimate result of this technique is a successful transaction route with as little wasted effort as possible. Changes in topology and missing critical path nodes will be handled gracefully and without any operator intervention.

Figure 4:
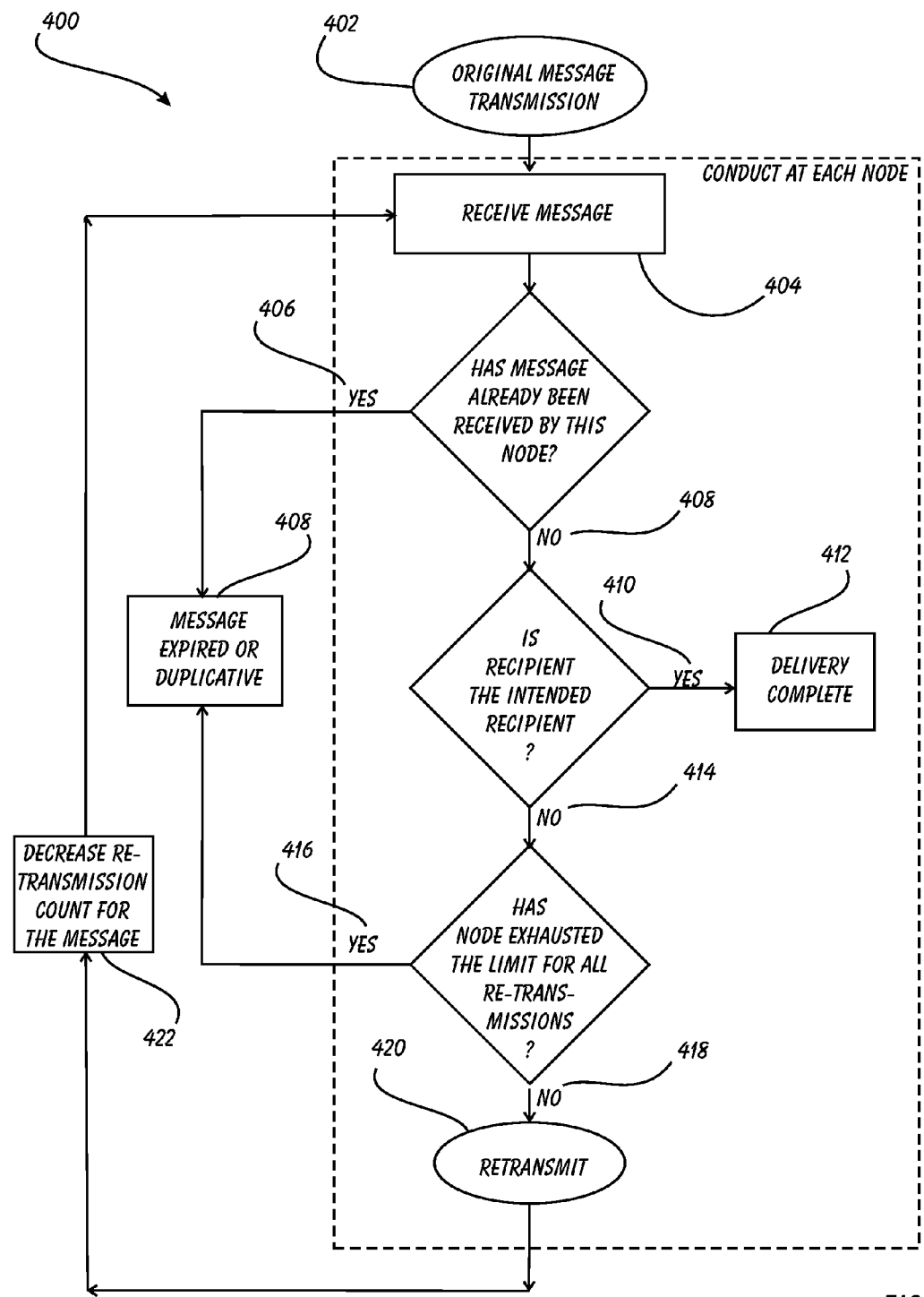
FIG. 4 is a flowchart depicting the steps iteratively executed by individual nodes within the communications network of FIG. 3.

The iterative process executed at each node in the mesh 400 is diagrammed in FIG. 4. The SN starts with the original message transmission 402. At each node within range of the SN, the message is received 404. If the message has already been received at the node of interest 406 (i.e. the MRN in the cache is already 0), the message is deleted from the cache 408 because it is duplicative.

If the message has not been received by a particular node 408, the node will analyze whether or not the node is the destination (DN) for the message. If so 410, the delivery is complete 412 (and a confirming message may be sent back to the SN).

If the node is not the destination node 414, then the node determines whether or not the MRN has reached zero (or its limit on number of retransmissions). If so 416, then the message will not be retransmitted because it is expired 408. Steps 406 and 416 will similarly be executed if the TTL parameter has reached zero (i.e. the message has time-expired).

If the time or retransmission limit has not been reached 418, then the message will be retransmitted 420 by the node. The retransmission count will be decreased (the MRN) 422 (actually prior to retransmission) so that it will be received by another node (i.e. the nodes won't be receiving their own retransmissions).

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A messaging method comprising the steps of:
   transmitting a message from a first node;
   receiving said message at a second node;
   transmitting said message from said second node;
   receiving said message at a third node; and
   wherein said second node transmitting is responsive to a time to live value, said time to live value defined as the time since said first node transmitting and, said second node transmitting further responsive to the number of times that said second node has transmitted said message;
   wherein said message of said first node transmitting comprises a message header defining an address of said first node and a unique identity for said message;
   the method further comprising a caching step between said second node receiving and said second node transmitting, said caching step comprising adding said received message to a storage cache associated with said node, each said message stored in said storage cache defined by said message header, said time to live value and a maximum retransmission value, wherein said second node transmitting is responsive to said time to live value and said maximum retransmission value; and
   wherein the messaging method is for an Ad Hoc network.

2. The messaging method of claim 1, further comprising a caching step after said third node receiving step, said caching step comprising adding said received message to a storage cache associated with said node, each said message stored in said storage cache defined by said message header, a time to live value and a maximum retransmission value, wherein said second node transmitting is responsive to said time to live value and said maximum retransmission value.

3. The method of claim 2, further comprising said third node transmitting an acknowledgement message destined for said first node, said acknowledgement message transmitting responsive to said third node determining that it is the destination for said first node transmitted message.

4. A method for wirelessly transmitting a message from a source node to a destination node, the method comprising the steps of:
   generating a message at said source node, said generated message comprising a message header and an address for said destination node;
   transmitting said message from said source node;
   receiving said message at a second node;
   transmitting said message from said second node responsive to a time to live value, said time to live value defined as the time since said source node transmitting; and
   receiving said message at said destination node;
   wherein said message header of said generating step comprises an address of said source node and a unique identity of said message; and
   further comprising a caching step between said second node receiving and transmitting steps, said caching step comprising saving said received message in a data storage repository associated with said second node, said caching step further comprises associating a said time to live value and a maximum retransmission value to said message; and
   wherein the messaging method is for an Ad Hoc network.

5. The method of claim 4, wherein said second node transmitting is responsive to said time to live values and said maximum retransmission values of each said message received.

6. The method of claim 5, wherein said time to live value of said cached message is used to determine whether or not too much time has elapsed since said source node transmitted said message.

7. The method of claim 6, wherein said maximum retransmission value of each said message is reduced by said second node prior to said second node transmitting step.

8. The method of claim 7, further comprising a second node retransmitting step prior to said destination node receiving step, said second node retransmitting step responsive to said time to live and said maximum retransmission values.

9. A wireless message network, comprising:
   a source node transmitting messages;
   one or more intermediate nodes receiving said transmitted messages and retransmitting said received messages, said intermediate nodes retransmitting responsive to a time to live value, said time to live value defined as the duration since said source node transmission of said message and said retransmitting further responsive to the limited number of permitted retransmission by said intermediate nodes of any received message; and
   a destination node for receiving said transmitted or retransmitted messages;
   wherein said transmitted and retransmitted messages comprise a message header, said message header comprising said source node address and a unique identity for each said message;
   said intermediate node further comprises a message storage cache associated therewith, said message storage cache further defined by said time to live of each said message and the maximum retransmission number for each said received message;
   wherein the wireless message network is an Ad Hoc network.

* * * * *